United States Patent
Sambhwani et al.

(10) Patent No.: US 9,635,646 B2
(45) Date of Patent: Apr. 25, 2017

(54) METHOD AND APPARATUS FOR CONFIGURING UPLINK AND DOWNLINK SERVING CELLS IN WIRELESS COMMUNICATIONS

(71) Applicant: QUALCOMM Incorporated, San Diego, CA (US)

(72) Inventors: Sharad Deepak Sambhwani, San Diego, CA (US); Arjun Bharadwaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 14/254,712

(22) Filed: Apr. 16, 2014

(65) Prior Publication Data

US 2014/0314001 A1    Oct. 23, 2014

Related U.S. Application Data

(60) Provisional application No. 61/813,129, filed on Apr. 17, 2013.

(51) Int. Cl.
*H04W 72/04* (2009.01)
*H04W 72/12* (2009.01)
(Continued)

(52) U.S. Cl.
CPC ............ *H04W 72/04* (2013.01); *H04B 7/022* (2013.01); *H04L 5/0091* (2013.01); *H04W 28/02* (2013.01);
(Continued)

(58) Field of Classification Search
CPC ..... H04W 72/04; H04W 48/20; H04W 92/20; H04B 7/024
(Continued)

(56) References Cited

U.S. PATENT DOCUMENTS

2004/0219920 A1    11/2004   Love et al.
2009/0219871 A1*   9/2009    Davis .................. H04W 76/066
                                                      370/329
(Continued)

FOREIGN PATENT DOCUMENTS

WO    WO 2011/097523 A1    8/2011
WO    WO 2011097523 A1 *   8/2011    ............. H04B 7/024
WO    WO2011097523 A1 *    8/2011

OTHER PUBLICATIONS

International Search Report and Written Opinion issued Jul. 15, 2014; Application No. PCT/US2014/034533.
Morimoto, A et al. "Investigation on Optimum Radio Link Connection Using Remote Radio Equipment in Heterogeneous Network for LTE-Advanced". IEEE 69th Vehicular Technology Conference, Apr. 26-29, 2009. Piscataway, Barcelona, Spain, pp. 1-5.

*Primary Examiner* — Jae Y Lee
*Assistant Examiner* — Jean F Voltaire
(74) *Attorney, Agent, or Firm* — Arent Fox LLP

(57) ABSTRACT

Methods and apparatuses relating to wireless communication of a user equipment (UE) are provided including receiving downlink wireless communications from multiple cells in an active set, receiving at least one of scheduling information for one or more downlink transmissions or one or more non-serving resource grants from a first cell in the active set, and receiving one or more serving resource grants for uplink communications from a second cell in the active set. In the wireless network, a second cell can be assigned as an uplink serving cell for uplink communications with the UE that is different from a first cell assigned as a downlink serving cell for downlink communications with the UE, and downlink transmissions can be scheduled from the downlink serving cell to the UE, and/or one or more serving resource grants can be transmitted from the uplink serving cell to the UE.

30 Claims, 9 Drawing Sheets

(51) Int. Cl.
  *H04W 52/32* (2009.01)
  *H04W 28/02* (2009.01)
  *H04B 7/022* (2017.01)
  *H04L 1/18* (2006.01)
  *H04L 5/00* (2006.01)
  *H04W 52/14* (2009.01)
  *H04W 52/24* (2009.01)

(52) U.S. Cl.
  CPC ..... *H04W 52/325* (2013.01); *H04W 72/1278* (2013.01); *H04W 72/1289* (2013.01); *H04L 1/1854* (2013.01); *H04L 5/0053* (2013.01); *H04W 52/146* (2013.01); *H04W 52/244* (2013.01)

(58) Field of Classification Search
  USPC .......................................................... 370/329
  See application file for complete search history.

(56) References Cited

U.S. PATENT DOCUMENTS

| | | | |
|---|---|---|---|
| 2011/0032894 A1* | 2/2011 | Miki | H04L 1/1854 370/329 |
| 2011/0249620 A1 | 10/2011 | Yu et al. | |
| 2011/0275382 A1* | 11/2011 | Hakola | H04W 24/10 455/452.2 |
| 2013/0044667 A1* | 2/2013 | Han | H04L 1/0025 370/311 |
| 2013/0044727 A1* | 2/2013 | Nory | H04L 5/0092 370/330 |
| 2013/0089034 A1 | 4/2013 | Acharya et al. | |
| 2013/0090127 A1* | 4/2013 | Nishikawa | H04W 72/082 455/452.1 |
| 2013/0322374 A1* | 12/2013 | Cai | H04W 52/244 370/329 |

* cited by examiner

METHOD AND APPARATUS FOR CONFIGURING UPLINK AND DOWNLINK SERVING CELLS IN WIRELESS COMMUNICATIONS

CLAIM OF PRIORITY UNDER 35 U.S.C. §119

The present application claims priority to Provisional Application No. 61/813,129, entitled "DIFFERENT SERVING HS-DSCH/E-DCH CELLS," filed Apr. 17, 2013, the entirety of which is incorporated by reference herein.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). Another standard can include 3GPP long term evolution (LTE). The UMTS also supports enhanced 3G data communications protocols, such as High Speed Packet Access (HSPA), which provides higher data transfer speeds and capacity to associated UMTS networks.

User equipment (UE) can communicate with multiple cells in an active set over such networks to receive wireless network access. This can increase throughput at the UE by allowing the UE to simultaneously receive downlink communications from the multiple cells in a given network. In current systems, one of the multiple cells is considered the serving cell for managing resources relating to uplink communications from the UE, which is usually the cell with more desirable downlink radio conditions as measured by the UE. In addition, one or more base stations can provide each of the multiple cells, and the base stations are often of different power classes (e.g., macro cell base stations that transmit on the order of 20 Watts (W), pico cell base stations that transmit on the order of 1 W, etc.). UEs, however, transmit uplink communications at a single power, which can result in a power imbalance at the cells.

For example, the UE can be served by a macro cell provided by a macro cell base station, but the UE can also be closer to a pico cell provided by a pico cell base station. Both cells can be in the active set of the UE such that the UE receives downlink communications from both the macro cell and the pico cell. In this example, the UE is situated such that the stronger power of the macro cell results in better radio conditions at the UE than the pico cell. Thus, though the UE is physically closer to the pico cell, the macro cell is the serving cell for the UE because its downlink power is greater than that of the pico cell (and/or the pathloss from the macro cell to the UE is lower than from the pico cell to the UE). The pico cell, however, may experience better radio conditions for receiving communications from the UE in its current location since the UE is physically closer to the pico cell (and/or the pathloss from the UE to the pico cell is lower than from the UE to the macro cell).

Furthermore, in some systems, the pico cell can transmit commands to the UE to lower its communication rate/power on uplink resources due to the UE's proximity to the pico cell and because the pico cell is in the UE's active set. Where the UE lowers its communication rate/power over the uplink resources, the macro cell, which is the serving cell for the UE, may receive unreliable uplink communications from the UE. This can impact the UE's ability to reliably communicate data back to the serving cell for providing to a wireless network, for indicating feedback on downlink communication resources, for controlling aspects of an uplink communication grant from the serving cell, etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication of a user equipment (UE) is provided. The method includes receiving downlink wireless communications from multiple cells in an active set, receiving at least one of scheduling information for one or more downlink transmissions or one or more non-serving resource grants from a first cell in the active set, and receiving one or more serving resource grants for uplink communications from a second cell in the active set.

In another aspect, an apparatus for wireless communication of a UE is provided. The apparatus includes an active set managing component operable for managing wireless communications with multiple cells in an active set, and a downlink communicating component operable for receiving at least one of scheduling information for one or more downlink transmissions or one or more non-serving resource grants from a first cell in the active set, and for receiving one or more serving resource grants for uplink communications from a second cell in the active set.

According to a further aspect, a method of wireless communication of a wireless network is provided. The method includes assigning a second cell as an uplink serving cell for uplink communications with a user equipment (UE) that is different from a first cell assigned as a downlink serving cell for downlink communications with the UE, at least one of scheduling downlink transmissions or transmitting one or more non-serving resource grants from the downlink serving cell to the UE, and transmitting one or more serving resource grants from the uplink serving cell to the UE.

In yet another aspect, an apparatus for wireless communication of a wireless network is provided. The apparatus includes an uplink serving cell assigning component operable for assigning a second cell as an uplink serving cell for uplink communications with a user equipment (UE) that is different from a first cell assigned as a downlink serving cell for downlink communications with the UE, a downlink transmission scheduling component operable for at least one of scheduling downlink transmissions or transmitting one or more non-serving resource grants from the downlink serving cell to the UE, and a serving grant component operable for transmitting one or more serving resource grants from the uplink serving cell to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Described herein are various aspects related to configuring different serving cells for downlink and uplink communications with a user equipment (UE) in a wireless network. For example, when a UE is situated such that the UE experiences more desirable radio conditions with a first cell than with a second cell for downlink communications, but where the UE also experiences more desirable radio conditions with the second cell than with the first cell for uplink communications, then the first cell can be configured as a serving cell for managing downlink communications to the UE while the second cell can be configured as a serving cell for managing uplink communications from the UE. In one specific example, the UE can receive serving resource grants from the second cell for communicating therewith while receiving scheduled downlink transmission and non-serving resource grants from the first cell.

Additionally, for example, the UE can communicate rate/power control information for the serving resource grants to the second cell. This allows the second cell to control the rate/power of the serving resource grants to the UE as opposed to the first cell that is the serving cell for downlink communications to the UE. Moreover, for example, the UE can communicate feedback information for the downlink transmissions to the second cell over resources granted by the second cell. Thus, in these examples, the second cell can be the serving cell for managing and receiving uplink communications from the UE when the UE is located such that more desirable uplink radio conditions are experienced between the UE and the second cell as compared to the first cell, while the first cell can remain the serving cell for downlink communications.

Figure 1:
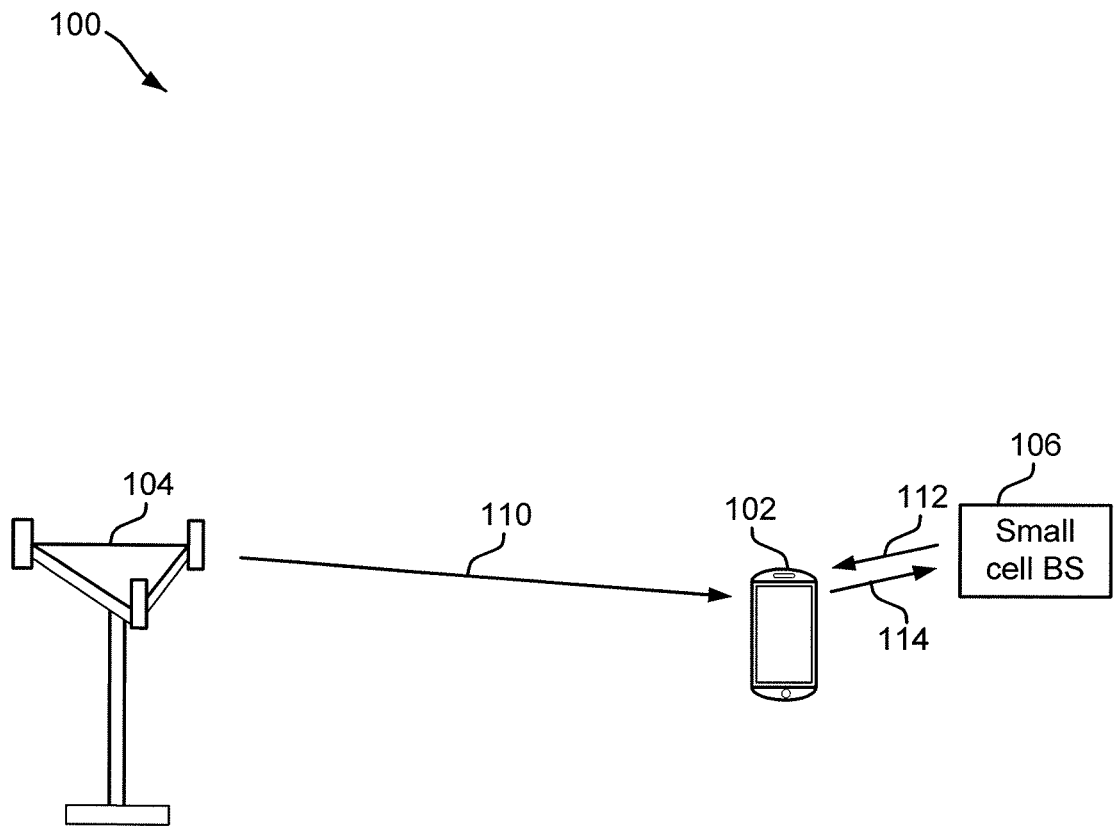
FIG. 1 is a schematic diagram illustrating an exemplary aspect of communicating with multiple base stations in a wireless communication system.
Figure 2:
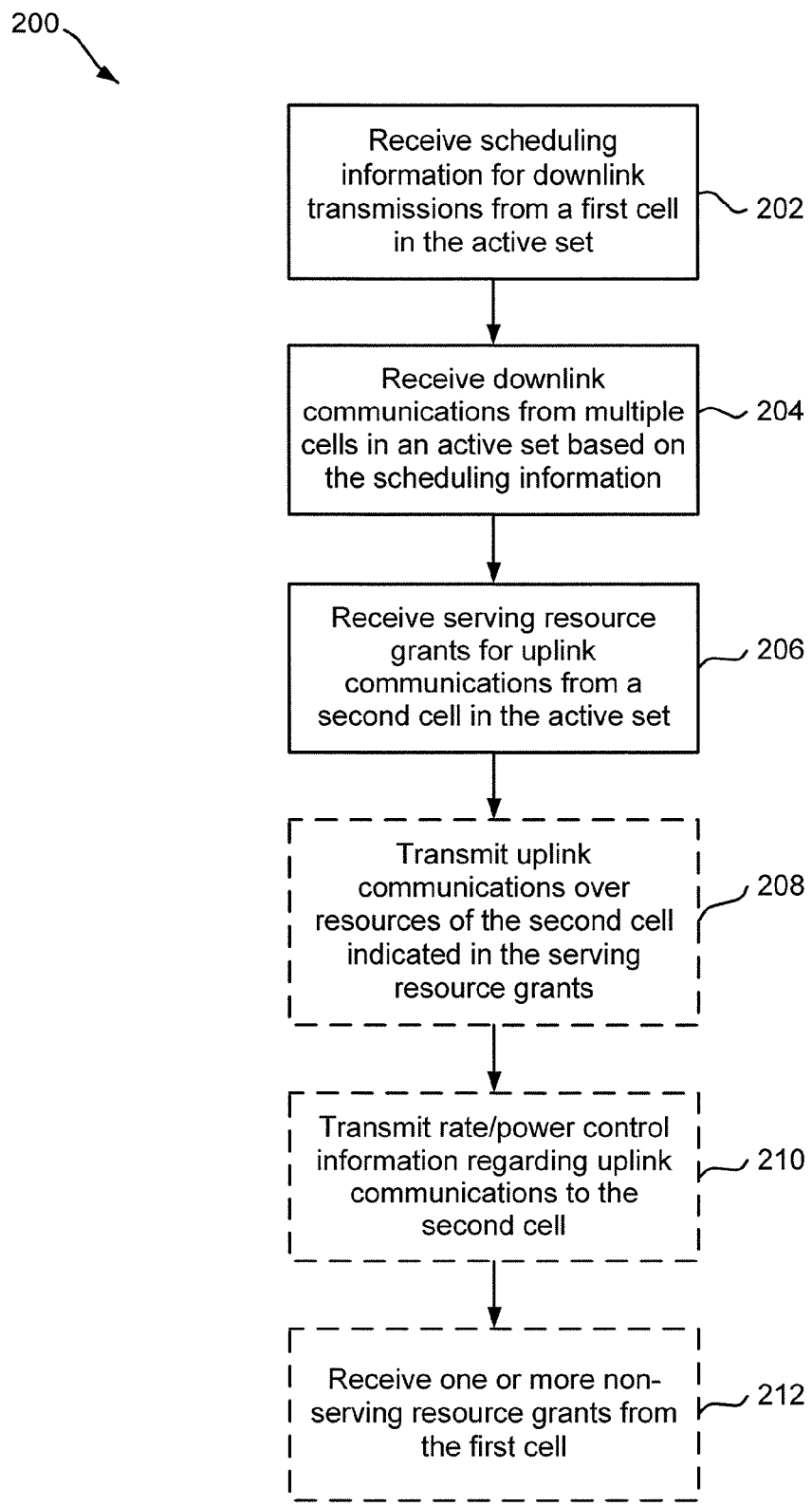
FIG. 2 is a flow diagram illustrating an exemplary method for receiving downlink and uplink serving information from multiple cells in a wireless communication system.
Figure 3:
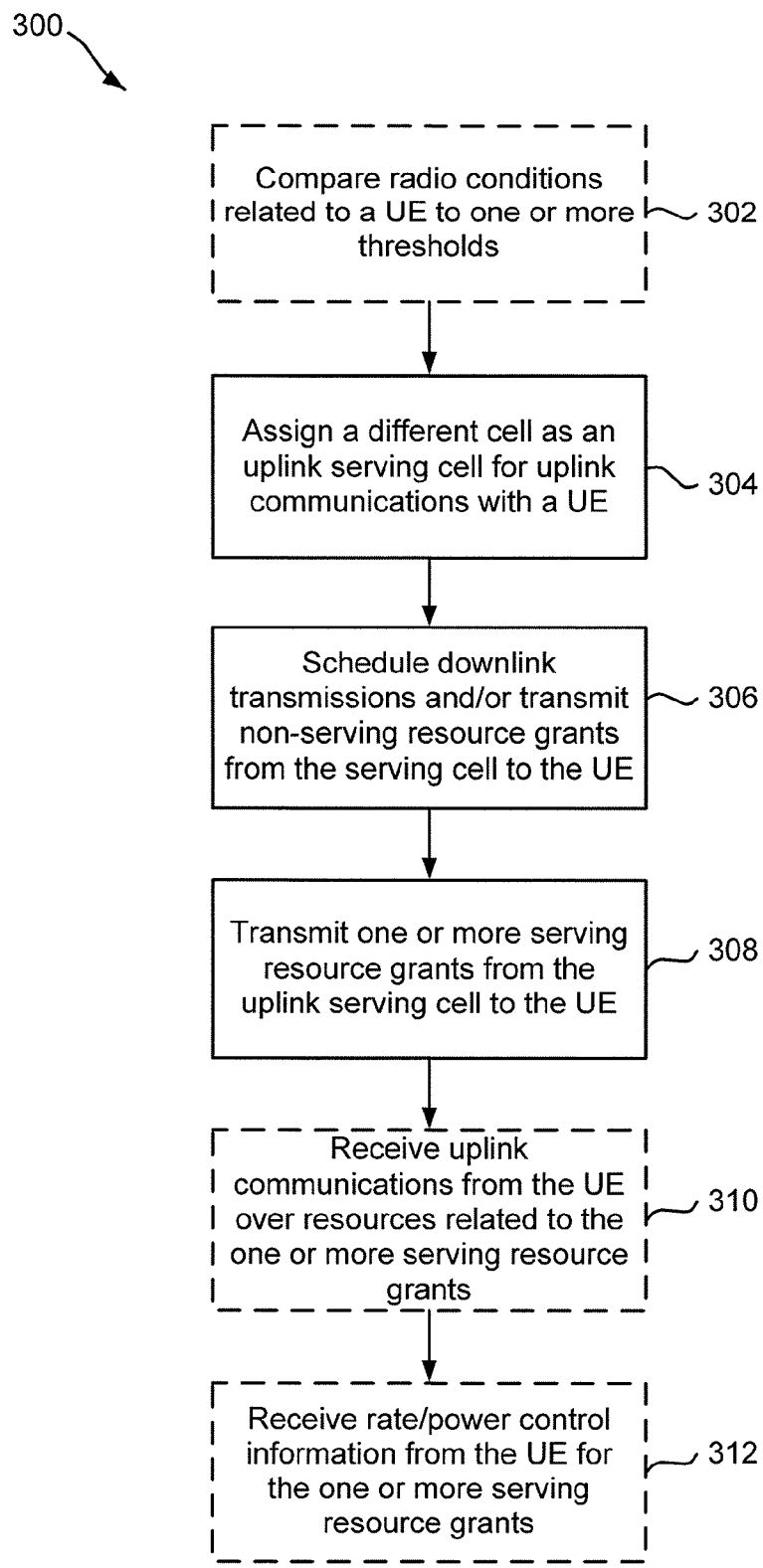
FIG. 3 is a flow diagram illustrating an exemplary method for assigning different downlink and uplink serving cells to a user equipment in a wireless communication system.

Referring to FIGS. 1-3, aspects of the present apparatus and method are depicted with reference to one or more components and one or more methods that may perform the actions or functions described herein. Although the operations described below in FIGS. 2 and 3 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

In a particular aspect, a system 100 (FIG. 1) is illustrated for communicating with multiple cells in a wireless network. System 100 includes a UE 102 that communicates with a macro cell base station 104 and a small cell base station 106 to access a wireless network (not shown). It is to be appreciated that the base stations 104 and 106 can provide respective cellular regions, also referred to herein as cells (not shown), within which the UE 102 can communicate to access the wireless network. As such, as used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. Further, macro cell base station 104 and small cell base station 106 are also connected to a radio network controller (RNC) or other network component (not shown) of a wireless network to facilitate providing UEs with access to the wireless network. Moreover, for example, UE 102 can support communicating with multiple cells, such that cells of the macro cell base station 104 and the small cell base station 106 can be in an active set of the UE 102. The active set of a UE is defined to include a set of base stations to which the UE can be simultaneously connected for communicating in the wireless network. For example, UE 102 can receive wireless network communications from the multiple cells in its active set to improve rate and/or throughput of the communications. Similarly, UE 102 may transmit communications to the multiple cells in its active set for such purposes.

A serving cell can be configured for managing downlink and uplink communications with the UE 102 by providing serving or non-serving resource grants, receiving feedback regarding data received over the grants, receiving and processing uplink communications from UE 102, and/or the like. In conventional systems, the same cell is selected as the serving cell for both downlink and uplink communications at the UE 102, and typically is selected as the cell with the most optimal downlink radio conditions as compared to other cells and/or a cell with downlink radio conditions measuring at least at a threshold level. In examples described herein, however, the UE 102 can have different serving cells for downlink and uplink communications.

For example, FIG. 2 includes a method 200 for receiving communications from different serving cells. Method 200 includes, at Block 202, receiving scheduling information for downlink transmissions from a first cell in the active set. UE 102 can include a downlink communicating component 412, as described in FIG. 4 operable for receiving the scheduling information for the downlink transmissions from the first cell, as described further herein. It is to be appreciated that UE 102 can receive the scheduling information using a receiver of the UE 102 adapted to receive signals from the one or more base stations 104 and 106 over one or more antennas, as described further herein. In one example, downlink communicating component 412 in FIG. 4 can include such a receiver for receiving scheduling information and other downlink transmissions. In addition, in FIG. 1 for example, the first cell can correspond to a cell provided by the macro cell base station 104, which can be a downlink serving cell for the UE 102. In this regard, macro cell base station 104 can schedule downlink transmissions for the UE 102 in the serving cell over downlink channel 110 by transmitting scheduling information over the downlink channel 110 to indicate resources over which the macro cell base station 104 and/or small cell base station 106 transmit data on respective downlink channels 110 and 112. As described further herein with respect to FIG. 4, a downlink serving cell base station 404, which can correspond to the macro cell base station 104 in FIG. 1, can include a downlink transmission scheduling component 420 for transmitting the scheduling information. Thus, the UE 102 can obtain the scheduling information (e.g., via the downlink communicating component 412) for receiving downlink communications from the macro cell base station 104 and the small cell base station 106 (and/or other cells that may be in the UE 102 active set) in the serving cell over the downlink channel 110 (e.g., via the downlink communicating component 412).

Method 200 also includes, at Block 204, receiving downlink communications from multiple cells in an active set based on the scheduling information. Downlink communicating component 412 of UE 102 depicted in FIG. 4 can be operable for receiving the downlink communications from the multiple cells. In addition, as depicted in FIG. 1, UE 102 receives downlink wireless communications from macro cell base station 104, as indicated over downlink channel at 110, and from small cell base station 106, as indicated at 112. For example, as described, macro cell base station 104 can provide a downlink channel 110 to the UE 102 to transmit data to the UE 102, and small cell base station 106 similarly provides a downlink channel 112, where information regarding the channel is indicated by the macro cell base station 104 in the scheduling information. For example, base stations 104 and 106 can simultaneously transmit to UE 102 over the downlink channels 110 and 112 to provide improved wireless communications to the UE 102. This can include transmitting substantially the same communications over substantially the same frequency and/or at substantially the same time, for example, to achieve a higher data rate than from a single cell. It is to be appreciated that base stations 104 and 106 can transmit signals to the UE 102 using a transmitter of the base stations 104 and 106 adapted to transmit signals over one or more antennas for receiving by the UE 102.

Method 200 also includes, at Block 206, receiving serving resource grants for uplink communications from a second cell in the active set. For example, downlink communicating component 412 of the UE 102 can be operable for receiving the serving resource grants from a uplink serving cell base station 406, which can be correlated to the small cell base station 106. In addition, in FIG. 1 for example, the second cell can correspond to a cell provided by the small cell base station 106. In this regard, for example, in addition to communicating over the downlink channel 112 to UE 102 based on communications scheduled by macro cell base station 104, small cell base station 106 can also provide serving resource grants to the UE 102 for establishing an uplink channel 114 for UE 102 to communicate with the small cell base station 106. Thus, it is to be appreciated that the serving resource grants can indicate resources over which the UE 102 can establish one or more uplink channels for communicating with the second cell. For instance, small cell base station 106 can establish the uplink channel 114 with UE 102 via the serving resource grants for receiving communicating from the UE 102 such that the cell provided by small cell base station 106 becomes the serving cell for uplink communications with the UE 102. In this regard, for example, UE 102 can transmit data to the small cell base station 106, which can include control data related to the downlink communications simultaneously received from macro cell base station 104 and small cell base station 106, data for providing to components of the wireless network, and/or the like.

Thus, UE 102 is served on the downlink by a first cell in the UE active set, while being served on the uplink by a second cell in the UE active set. As described further herein, assignment of different serving cells in this regard may be occur based at least in part on an imbalance between received downlink power at the UE from the first cell and received uplink power at the first cell from the UE, while the received uplink power at the second cell from the UE is greater than that at the first cell. Triggering of assigning different serving cells to a UE is described further herein and can be based on measurement of the different signal powers as reported by base stations of the cells, the UE, etc. For example, the serving downlink cell can be assigned as a cell in the active set of the UE at which the UE experiences downlink radio conditions relative to downlink radio conditions of remaining cells in the active set (e.g., the cell with the most optimal downlink radio conditions). Similarly, the serving uplink cell can be assigned as a cell in the active set of the UE that experiences uplink radio conditions from the UE relative to uplink radio conditions experienced by remaining cells in the active set (e.g., the cell experiencing the most optimal uplink radio conditions with the UE). Thus, in one example as described further herein, the serving downlink cell can be assigned based on UE measurements while the serving uplink cell can be assigned based on cell measurements of the UE.

Thus, method 200 can optionally include, at 208, transmitting uplink communications over resources of the second cell indicated in the serving resource grants. UE 102 can include an uplink communicating component 414 operable for transmitting over the resources related to the serving resource grants. UE 102 can thus transmit the uplink communications over uplink channel 114 provided by the small cell base station 106 in the serving resource grants sent to the UE 102. As described above with respect to the base stations 104 and 106, and further herein, it is to be appreciated that the UE 102 can similarly transmit uplink communications using a transmitter adapted to transmit signals over one or more antennas for receiving by one or more antennas (via receivers) at the base stations 104 and 106. For example, uplink communicating component 414 can include such a transmitter.

Moreover, method 200 can optionally include, at 210, transmitting rate/power control information regarding uplink communications to the second cell. For instance, uplink communicating component 414 in FIG. 4 can optionally include a rate/power controlling component 416 operable for transmitting the rate/power control information. In this example, UE 102 can transmit this information to the small cell base station 106 over the uplink channel 114 or another channel provided by the small cell base station 106. In any case, small cell base station 106 can adjust the serving resource grants of the uplink channel 114 for the UE 102 based at least in part on the information, as described further herein.

In addition, method 200 can optionally include, at 212, receiving one or more non-serving resource grants from the first cell. For example, macro cell base station 104 can transmit non-serving resource grants and related information for UE 102 over downlink channel 110 or a related channel, which the UE 102 can receive over downlink channel 110 and can accordingly adjust an uplink resource grant from the small cell base station 106, or transmission over resources related to the uplink resource grant, based on the non-serving grant. As described herein with respect to FIG. 4, the downlink serving cell base station 404 can optionally include a non-serving grant component 422 for transmitting the non-serving grants. Non-serving grants can be used, for example, to adjust a serving resource grant of an uplink channel (e.g., a rate or power of the grant to mitigate interference from the UE 102 when communicating over the uplink channel). The UE 102 can receive the non-serving grants (e.g., via downlink communicating component 412) and can accordingly adjust an uplink channel, as described further herein.

Figure 4:
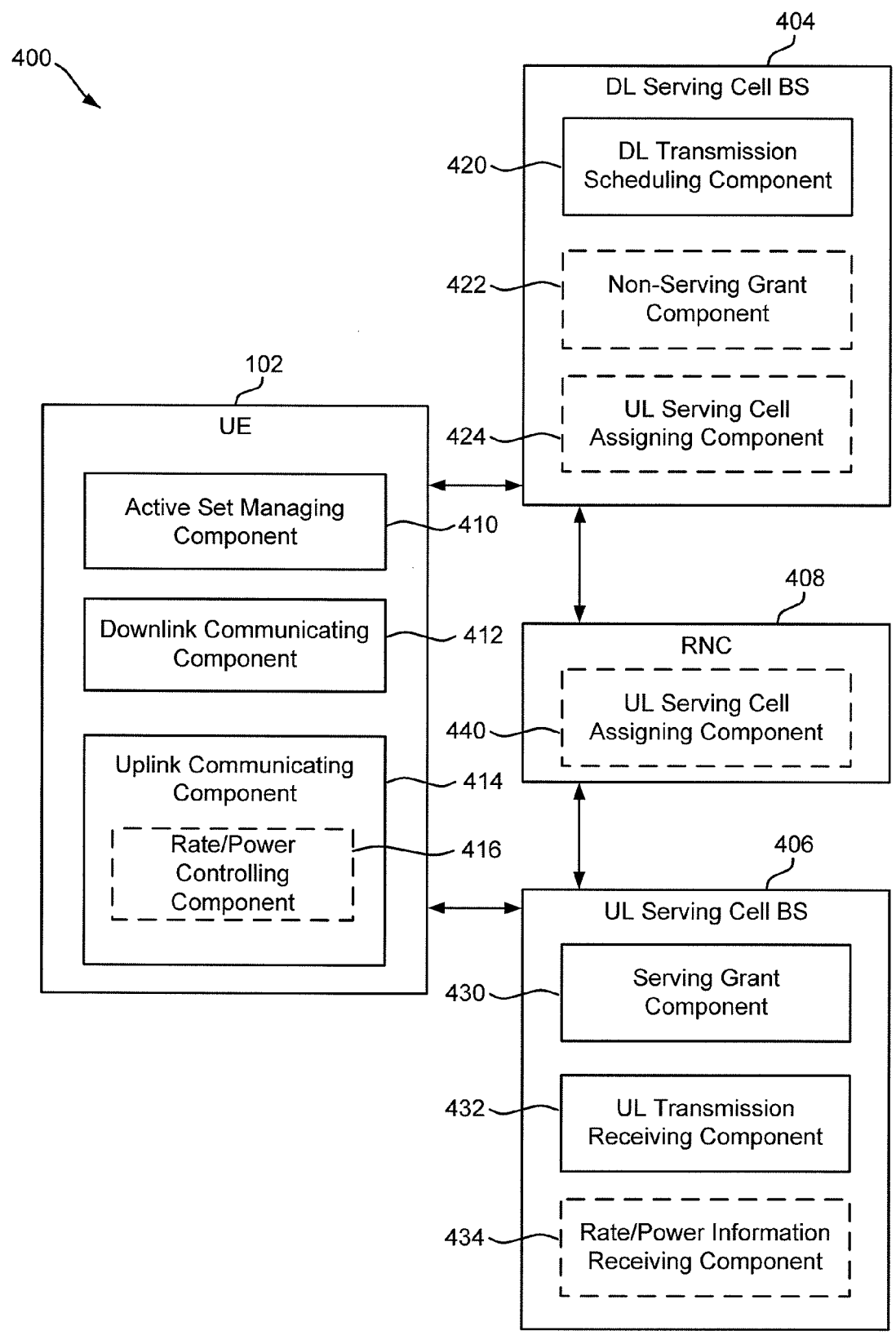
FIG. 4 is a block diagram of an example system for utilizing different downlink and uplink serving cells in a wireless communication system.

In FIG. 3, method 300 optionally includes, at Block 302, comparing radio conditions related to a UE to one or more thresholds. In FIG. 4, downlink serving cell base station 404, which can correlate to the macro cell base station 104, optionally includes an uplink serving cell assigning component 424 operable for comparing the radio conditions (e.g., in determining whether to reassign an uplink serving cell for the UE 102). In an alternative example, RNC 408 in FIG. 4 optionally includes a uplink serving cell assigning component 440 operable for such purposes, as described further herein. For example, this optional comparison can trigger assigning different cells as serving cells for the uplink and downlink, as described, though it is to be appreciated that different uplink and downlink serving cells can be assigned under substantially any circumstances or events related or unrelated to radio conditions at the serving cell.

When Block 302 is performed, for example, this comparison can occur at one or more RNCs, such as RNC 308 in FIG. 4, that communicate with the macro cell base station 104, such as downlink serving cell base station 404, and the small cell base station 106, such as uplink serving cell base station 406, such to receive uplink radio conditions of the UE 102 at the cells. Where macro cell base station 104 reports radio conditions of the UE 102 uplink (e.g., reference signal code power (RSCP), reference signal received power (RSRP), or similar measured conditions) are less than a threshold (and/or small cell base station 106 reports radio conditions of the UE 102 uplink that achieve or exceed another threshold), the RNC(s) can trigger reassignment of an uplink serving cell for the UE 102 to small cell base station 106 (e.g., via uplink serving cell assigning component 440, as described herein). In one example, triggering the reassignment can be further based at least in part on determining downlink conditions of the small cell reported by the UE 102 as achieving or exceeding yet another threshold.

In another example, Block 302, if performed, may be performed at the serving cell based at least in part on comparing radio conditions of the UE 102 uplink measured in the cell, and determining the conditions are less than a threshold, which can result in reassigning the uplink serving cell of the UE 102. For example, this can be performed by uplink serving cell assigning component 424 at downlink serving cell base station 404 in FIG. 4, which can correlate to the macro cell base station 104. In addition, in this example, the comparing can include comparing radio conditions of small cell base station 106 reported by the UE 102 to the macro cell base station 104 to determine if these conditions achieve or exceed another threshold, which can additionally or alternatively result in reassigning the uplink serving cell for the UE 102. Therefore, as described, comparison of the radio conditions relative to the one or more thresholds may result in a determination to assign a different cell as the uplink serving cell for the UE 102.

Thus, method 300 includes, at Block 304, assigning a different cell as an uplink serving cell for uplink communications with a UE. As described, uplink serving cell assigning component 424 or 440 of the downlink serving cell base station 404 or RNC 408 in FIG. 4 can be operable for assigning uplink serving cell base station 406 to provide the uplink serving cell for UE 102. In addition, in FIG. 1 for example, small cell base station 106 can be assigned to provide the uplink serving cell for the UE 102 while macro cell base station continues to provide the downlink serving cell for UE 102. The assigning can be based on the comparing in optional Block 302 to determine to assign the small cell base station 106 as the uplink serving cell or otherwise. As described, assigning the small cell base station 106 to provide the uplink serving cell can include the small cell base station 106 providing one or more serving resource grants for the uplink channel 114 to the UE 102, while macro cell base station 104 continues to schedule downlink transmissions for the UE 102.

In an example, the macro cell base station 104 can transmit a communication to small cell base station 106 (e.g., via uplink serving cell assigning component 424 in FIG. 4) to indicate that the small cell base station 106 is to provide the uplink serving cell for UE 102. This communication can occur over a backhaul connection between base stations 104 and 106, via one or more RNCs connected to base stations 104 and 106, and/or the like. In another example, small cell base station 106 can receive the indication from the RNC (e.g., via uplink serving cell assigning component 440 in FIG. 4), determine to provide the uplink serving cell for the UE 102 based at least in part on measuring radio conditions of the UE 102 uplink at small cell base station 106 to determine whether the conditions achieve or exceed a threshold, and/or the like.

In this regard, for example, method 300 further includes, at Block 306, scheduling downlink transmissions and/or transmitting non-serving resource grants from the serving cell to the UE. For example, downlink serving cell base station 404 in FIG. 4 includes a downlink transmission scheduling component 420 and optionally a non-serving grant component 422 operable for respectively scheduling downlink transmissions and transmitting non-serving resource grants, as described further herein. Moreover, for example, downlink transmission scheduling component 420 and non-serving grant component 422 can include a transmitter for transmitting the scheduling information and/or the non-serving resource grants. Method 300 also includes, at Block 308, transmitting one or more serving resource grants from the uplink serving cell to the UE. For example, uplink serving cell base station 406 includes a serving grant component 430 operable for transmitting the serving resource grants to the UE 102 (e.g., based on being assigned as the uplink serving cell for the UE 102). It is to be appreciated that serving grant component 430 can include a transmitter for transmitting the serving resource grants to the UE 102, as described further herein.

As described, for example, the macro cell base station 104 schedules downlink transmissions for the UE 102 to receive from macro cell base station 104 and small cell base station 106 over downlink channels 110 and 112 (and/or other downlink channels of other base stations in the UE 102 active set). The macro cell base station 104 can schedule the downlink transmissions using downlink channel 110 to communicate related scheduling information to the UE 102, which the UE 102 obtains for determining when to receive transmissions from the cells. The macro cell base station 104 can also transmit non-serving resource grants using downlink channel 110 to modify parameters of an uplink of the UE 102 (e.g., a rate/power, etc.), which the UE 102 obtains for modifying an uplink channel with the small cell base station 106. Moreover, the small cell base station 106 transmits one or more uplink serving resource grants to the UE 102 (e.g., over downlink channel 112 or another channel) to allow the UE 102 to establish uplink channel 114 with the small cell base station 106 based on the uplink serving resource grants.

Method 300 also optionally includes, at Block 310, receiving uplink communications from the UE over resources related to the one or more serving resource grants. For example, uplink serving cell base station 406 can include an uplink transmission receiving component 432 operable for receiving communications from the UE 102 over the resources. For instance, uplink transmission receiving component 432 can include a receiver for such purposes, as described herein. In addition, in FIG. 1 for example, this can include small cell base station 106 receiving communications from UE 102 over the uplink channel 114, as described.

In addition, method 300 optionally includes, at Block 312, receiving rate/power control information from the UE for the one or more serving resource grants. For example, uplink serving cell base station 406 can optionally include a rate/power information receiving component 434 operable for receiving the rate/power control information from the UE 102. For instance, rate/power information receiving component 434 can include a receiver for such purposes, as described herein. In FIG. 1, in this example, UE 102 communicates the rate/power control information to select a rate/power for the uplink channel 114, and small cell base station 106 can adjust a current uplink channel or serving resource grant or can initiate a new channel or resource grant based at least in part on the rate/power control information received from the UE 102.

In a specific example, macro cell base station 104 and small cell base station 106 can communicate with UE 102 using HSPA such that the macro cell base station 104 provides downlink channel 110 and small cell base station 106 provides downlink channel 112 as a high-speed downlink shared channel (HS-DSCH) over which macro cell base station 104 schedules transmissions for UE 102. Thus, macro cell base station 104 continues to schedule the HS-DSCH transmissions, while small cell base station 106, once being assigned to provide the uplink serving cell, provides the serving enhanced dedicated channel (E-DCH) for the UE 102 for transmitting feedback (e.g., hybrid automatic repeat/request (HARQ) acknowledgement (ACK)/non-acknowledgement (NAK) data, channel quality indicator (CQI) data, etc.) for HS-DSCH or other uplink transport data (e.g., user plane data) for communicating in the wireless network. Thus, small cell base station 106, in this example, can communicate information regarding E-DCH 114 to UE 102 over an enhanced absolute grant channel (E-AGCH), which can be transmitted over downlink channel 112.

Moreover, in this specific example, UE 102 can communicate rate/power control information to small cell base station 106 (e.g., over the E-DCH 114), which can relate to controlling rate/power of the serving resource grant for E-DCH 114. Thus, small cell base station 106 can process the information, and can modify the E-DCH 114 or otherwise assign resources related to the E-DCH 114 by communicating information over a fractional dedicated physical channel (F-DPCH) over downlink channel 112 based at least in part on the information received regarding controlling the rate/power from UE 102. Moreover, in an example, the F-DPCH information can be generated based at least in part on one or more radio conditions observed for the UE 102 to set the rate/power based on the radio conditions (e.g., UEs with desirable conditions can transmit at a lower rate/power to avoid causing excessive interference and/or use of radio resources at the small cell base station 106). In this example, because small cell base station 106 is the serving cell for the uplink E-DCH 114, F-DPCH from the small cell base station 106 controls rate/power based on information at the more desirable cell for receiving uplink communications from the UE 102. This is opposed to the conventional case where the UE 102 would be served on the uplink as well by macro cell base station 104, and thus F-DPCH information from the small cell base station 106 may cause the UE 102 to lower rate/power to the point where the macro cell base station 104 no longer reliably receives the E-DCH from UE 102.

FIG. 4. Illustrates an example system 400 for assigning different uplink and downlink serving cells to a UE. System 400 includes a UE 102 for communicating with one or more base stations for accessing a wireless network, as described. For example, UE 102 can communicate with a downlink serving cell base station 404 and/or an uplink serving cell base station 406. In one example, referring additionally to FIG. 1, the downlink serving cell base station 404 may be macro cell base station 104, and the uplink serving cell base station 406 may be the small cell base station 106 performing the functions described herein. In addition, the base stations 404 and 406 can communicate with one or more RNCs 408 to provide access to the wireless network. The RNC(s) 408 may also facilitate communications between the base stations 404 and 406 for assigning different uplink and downlink serving cells for the UE 102.

UE 102 may comprise any type of mobile device, such as, but not limited to, a smartphone, cellular telephone, mobile phone, laptop computer, tablet computer, or other portable networked device that can be a standalone device, tethered to another device (e.g., a modem connected to a computer), and/or the like. In addition, UE 102 may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air (OTA) communication link using one or more OTA communication protocols described herein. Additionally, in some examples, UE 102 may be configured to facilitate communication on multiple separate networks via multiple separate subscriptions, multiple radio links, and/or the like.

Furthermore, downlink serving cell base station 404 and uplink serving cell base station 406 may comprise one or more of any type of network module, such as an access point, a macro base station (BS), Node B, eNodeB (eNB), a relay, a peer-to-peer device, or substantially any device that can access wireless network components (e.g., an authentication, authorization and accounting (AAA) server, a mobile switching center (MSC), a mobility management entity (MME), a radio network controller (RNC), one or more gateways, etc.).

UE 102 includes an active set managing component 410 for storing information regarding an active set at the UE 102, which may include downlink serving cell base station 404 and uplink serving cell base station 406 from which the UE 102 can simultaneously receive communications in a wireless network. UE 102 can also include a downlink communicating component 412 for receiving downlink communications from one or more base stations (e.g., using a receiver, as described further herein), and an uplink communicating component 414 for transmitting communications to one or more base stations (e.g., using a transmitter, as described further herein). Uplink communicating component 414 can also include a rate/power controlling component 416 for communicating information for controlling rate/power of uplink resources from an uplink serving cell base station 406.

Downlink serving cell base station 404 can include a downlink transmission scheduling component 420 for scheduling downlink transmissions from downlink serving cell base station 404 an other base stations in a UE's active set, such as UE 102, an optional non-serving grant component 422 for communicating non-serving grants (e.g., relative grants over an enhanced relative grant channel (E-RGCH) in HSPA) to the UE, and/or an optional uplink serving cell assigning component 424 for assigning a different cell provided by a different base station as an uplink serving cell for the UE.

Uplink serving cell base station 406 can include a serving grant component 430 for communicating serving resource grants (e.g., absolute grants over E-AGCH in HSPA) to a UE, such as UE 102, an uplink transmission receiving component 432 for receiving uplink communications from the UE over resources related to the serving resource grant, and/or an optional rate/power information receiving component 434 for obtaining rate/power information related to assigning the granted resources to the UE.

RNC 408 may optionally include the uplink serving cell assigning component 440, for example, for switching an uplink serving cell of a UE to be different from a downlink serving cell of the UE. As described, this functionality can exist in the RNC 408 or in the downlink serving cell base station 404 (or substantially any component of the wireless network that can communicate with one or more base stations).

According to an example, active set managing component 410 can store information regarding an active set for the UE 102, which can include information regarding downlink serving cell base station 404 and uplink serving cell base station 406, from which UE 102 can simultaneously receive downlink communications in a wireless network. As UE 102 moves throughout a network, for example, active set managing component 410 can add and remove cells from the active set of the UE 102 based on detected radio conditions of the cells and/or whether the UE 102 ceases or initiates communications with the cells. In any case, as described, downlink communicating component 412 can simultaneously receive downlink communications from multiple cells in the active set (e.g., as described in step 202 of method 200 in FIG. 2).

Downlink serving cell base station 404 can be assigned as the downlink serving cell for the UE 102 (e.g., based on radio conditions at the downlink serving cell provided by downlink serving cell base station 404). Thus, downlink transmission scheduling component 420 can schedule downlink transmissions from the cells in the UE 102 active set (e.g., as described in step 306 of method 300 in FIG. 3). Downlink communicating component 412 of the UE 102 can receive scheduling information from the downlink serving cell base station 404 in this regard, and can receive the downlink transmissions simultaneously from the cells in the active set of the UE 102 (e.g., as described in step 204 of method 200 in FIG. 2).

Uplink serving cell base station 406 can be assigned as the uplink serving cell for UE 102. For example, this can occur upon initialization of the UE 102 in the wireless network, at a point in time where certain radio conditions are detected relating to the UE 102, and/or the like (e.g., as described in Blocks 302 and 304 of method 300 in FIG. 3). Thus, in one example, the downlink serving cell provided by downlink serving cell base station 404 can initially be assigned as the uplink serving cell of the UE 102. In this example, uplink serving cell assigning component 424 can detect that radio conditions of the uplink from the UE 102 at the downlink serving cell have degraded to be less than a threshold level. For example, uplink serving cell assigning component 424 can detect the degradation based at least in part on comparing a RSCP, RSRP, or similar measurements of signals received from the UE 102 with threshold values to determine if the measured value is less than (or equal to in some examples) the threshold value. If so, uplink serving cell assigning component 424 can reassign another cell in the UE 102 active set as the uplink serving cell for the UE 102.

For example, uplink serving cell assigning component 424 can assign a remaining cell in the active set as the uplink serving cell, assign a cell based at least in part on reported measurements thereof (e.g., based on a measurement report, which can include measurements of the uplink serving cell base station 406, such as RSCP, RSRP, etc., as reported by the UE 102), assign a cell based on measurements reported by the cell (e.g., similar measurements of the UE 102 uplink reported over a backhaul, via RNC 408, etc.), and/or the like. In an example, uplink serving cell assigning component 424 may assign another cell as the uplink serving cell where the measurements of the UE 102 uplink are less than a threshold and where reported measurements from the UE 102 and/or from the another cell achieve or exceed another threshold.

In another example, uplink serving cell assigning component 440 at the RNC 408 can reassign an uplink serving cell for the UE 102. In this example, uplink serving cell assigning component 440 can receive measurements of the UE 102 uplink from downlink serving cell base station 404, uplink serving cell base station 406, and/or other base stations in the active set of the UE 102. In this regard, uplink serving cell assigning component 440 can determine whether to assign a different uplink serving cell to the UE 102 where the measurements of the UE 102 at downlink serving cell base station 404 are less than a threshold while measurements of the UE 102 at uplink serving cell base station 406 or another base station achieve or exceed another threshold. In another example, uplink serving cell assigning component 440 can determine whether to assign a different uplink serving cell to the UE 102 where the difference in measurements of the UE 102 uplink at downlink serving cell base station 404 and uplink serving cell base station 406 achieves or exceeds a threshold.

In any case, when the uplink serving cell base station 406 is reassigned as the uplink serving cell for the UE 102, serving grant component 430 can communicate a serving grant to the UE 102 for facilitate uplink communications (e.g., as described in Block 306 of method 300 in FIG. 3). For example, the serving grant can relate to an uplink communication channel, such as E-DCH in HSPA. Downlink communicating component 412 can receive the serving grant from the uplink serving cell base station 406 (e.g., as described in Block 206 of method 200 in FIG. 2). In this regard, uplink communicating component 414 can establish the uplink channel with the uplink serving cell base station 406 (e.g., uplink channel 114 in FIG. 1), and can transmit uplink communications to the uplink serving cell base station 406 while receiving scheduling information for downlink transmissions and/or non-serving grants from downlink serving cell base station 404 (e.g., as described in Block 208 of method 200 in FIG. 2). Uplink transmission receiving component 432 can receive the uplink communications from UE 102 over the uplink channel (e.g., as described in Block 308 of method 300 in FIG. 3). The uplink communications can relate to control data for the downlink transmissions received from downlink serving cell base station 404 and uplink serving cell base station 406, transport data (e.g., user plane data) for communicating to one or more wireless network components, and/or the like.

Moreover, in this regard, non-serving grant component 422 of the downlink serving cell base station 404 can generate non-serving grant information and can communicate the non-serving grant information, which is received by the downlink communicating component 412 for updating utilization of a related uplink serving resource grant (e.g., as described in Block 204 of method 200 in FIG. 2). As described, non-serving grant component 422 can communicate this information to the UE 102 over an E-RGCH in HSPA. Because the base station with desirable uplink radio conditions provides the uplink serving cell for the UE 102, non-serving grants from other base stations that lower the rate/power of the UE 102 will likely have very little, if any, impact on uplink communications between the UE 102 and its uplink serving cell.

In addition, in an example, rate/power controlling component 416 can specify rate/power controlling information for the uplink resource grant to uplink serving cell base station 406 (e.g., as described in Block 208 of method 200 in FIG. 2). Rate/power information receiving component 434 can obtain the rate/power controlling information from UE 102 (e.g., as described in Block 312 of method 300 in FIG. 3). Serving grant component 430 can use the rate/power information from the UE 102 to set rate/power of the uplink serving grant resources for the UE 102. In one example, serving grant component 430 can communicate rate/power parameters for the uplink serving grant resource over an F-DPCH in HSPA. Uplink communicating component 414 can receive the parameters, and can establish or modify the uplink channel with the uplink serving cell base station 406, and/or transmission sent over the channel by uplink communicating component 414, based at least in part on the parameters.

Figure 5:
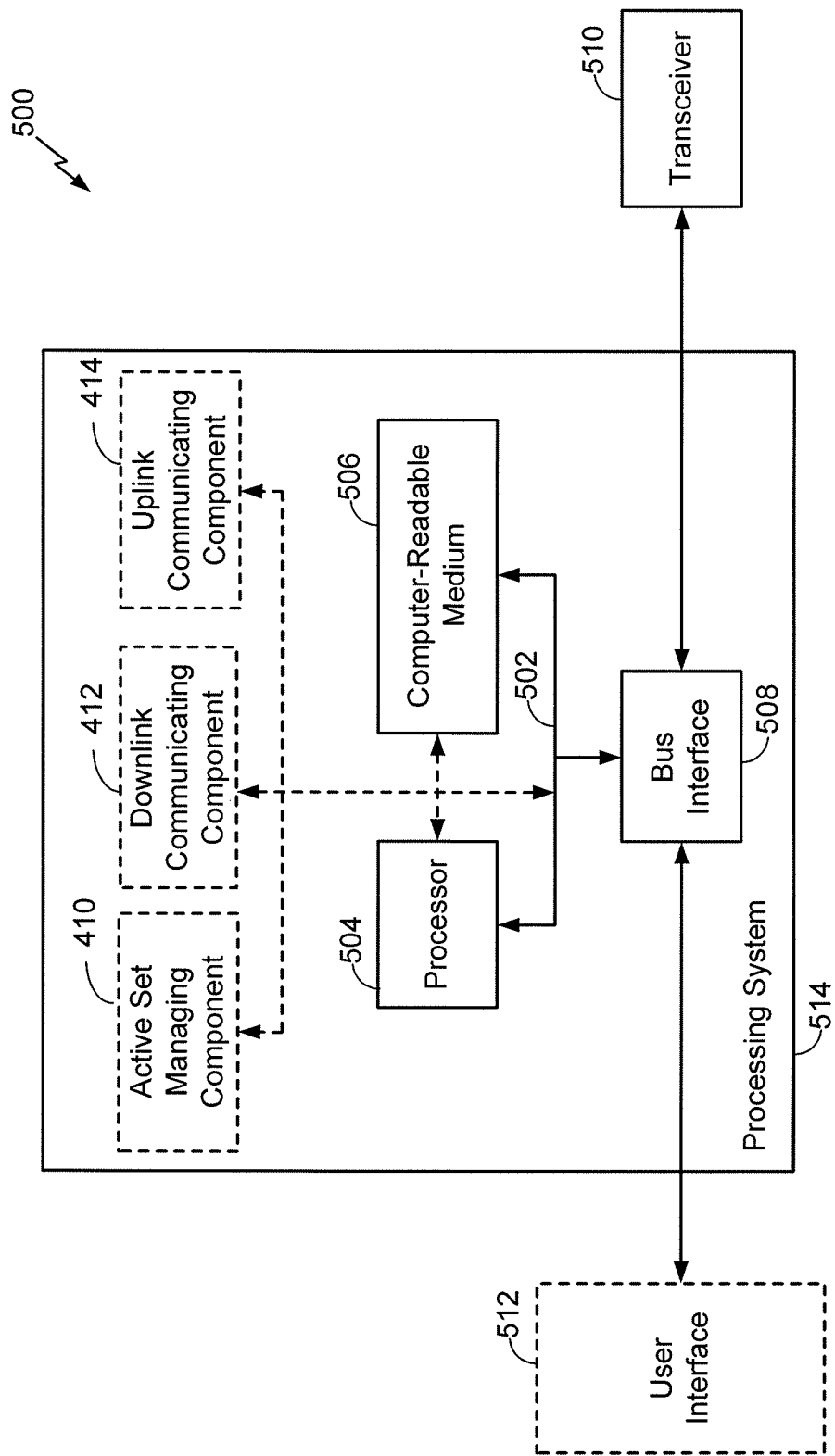
FIG. 5 is a block diagram illustrating an example of a hardware implementation for an apparatus employing a processing system to perform functions described herein.

FIG. 5 is a block diagram illustrating an example of a hardware implementation for an apparatus 500 employing a processing system 514. Apparatus 500 may be configured to include, for example, one of UE 102 (FIGS. 1 and 4), macro cell base station 104 or downlink serving cell base station 404 (FIGS. 1 and 4), small cell base station 106 or uplink serving cell base station 406 (FIGS. 1 and 4), RNC 408 (FIG. 4), etc. Apparatus 500 is depicted as including components of UE 102, including active set managing component 410, downlink communicating component 412, uplink communicating component 414, etc., as described above. It is to be appreciated that apparatus 500 can additionally or alternatively include one or more of the components of downlink serving cell base station 404, uplink serving cell base station 406, or RNC 408, each as described above with respect to FIG. 4; the components of UE 102 are shown for ease of explanation.

In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, and computer-readable media, represented generally by the computer-readable medium 506. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium, and may include a receiver and/or transmitter, as described further herein. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described infra for any particular apparatus. The computer-readable medium 506 may also be used for storing data that is manipulated by the processor 504 when executing software.

In an aspect, processor 504, computer-readable medium 506, or a combination of both may be configured or otherwise specially programmed to perform the functionality of the active set managing component 410, downlink communicating component 412, uplink communicating component 414, or various other components described herein. For example, processor 504, computer-readable medium 506, or a combination of both may be configured or otherwise specially programmed to perform the functionality of the downlink transmission scheduling component 420, non-serving grant component 422, or uplink serving cell assigning component 424 of the downlink serving cell base station 404, serving grant component 430, uplink transmission receiving component 432, or rate/power information receiving component 434 of uplink serving cell base station 406, uplink serving cell assigning component 440 of RNC 408, and/or the like.

The various concepts presented throughout this disclosure may be implemented across a broad variety of telecommunication systems, network architectures, and communication standards.

Figure 6:
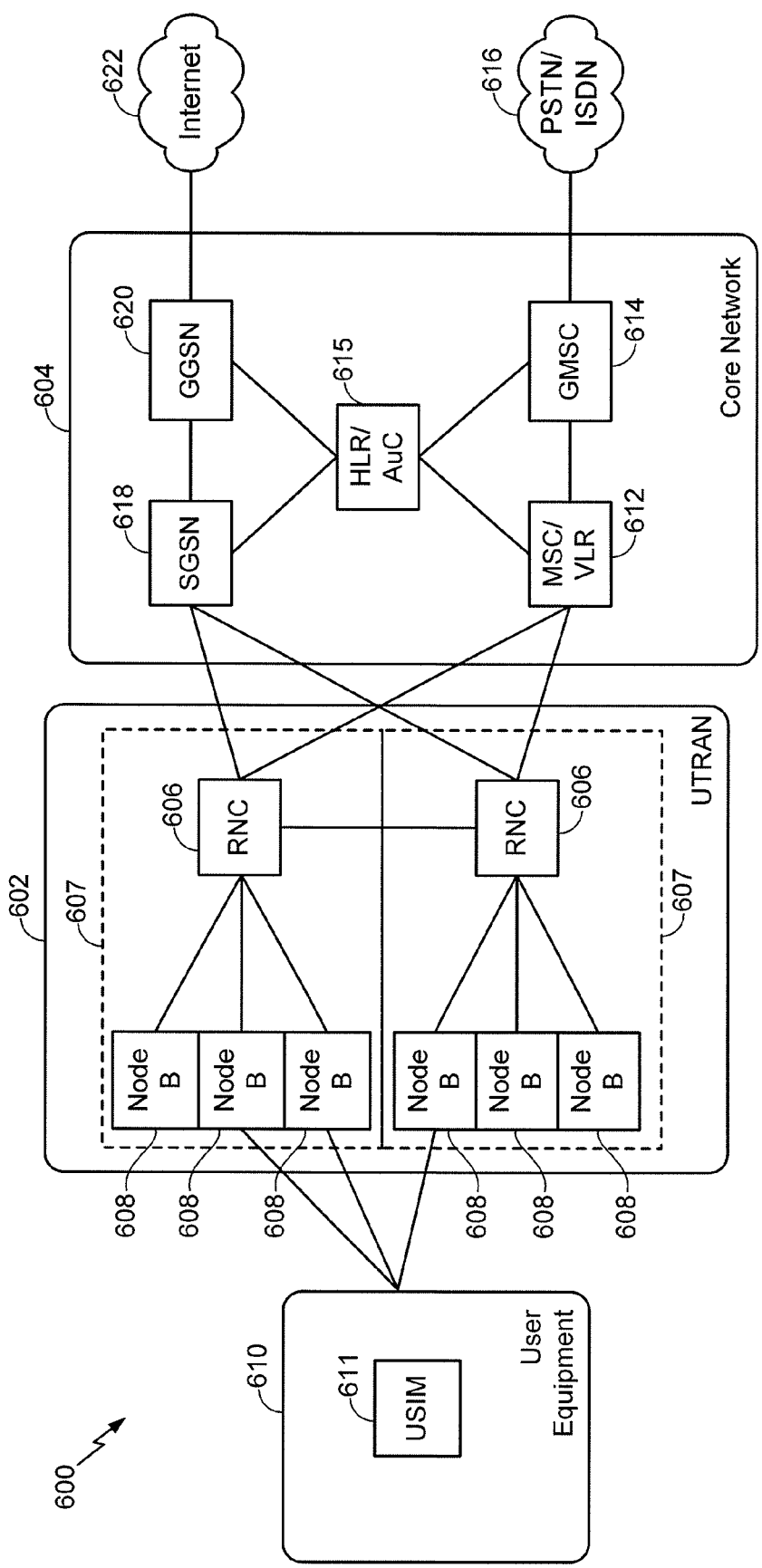
FIG. 6 is a block diagram conceptually illustrating an example of a telecommunications system including a UE configured to perform functions described herein.

Referring to FIG. 6, by way of example and without limitation, the aspects of the present disclosure are presented with reference to a UMTS system 600 employing a W-CDMA air interface. A UMTS network includes three interacting domains: a Core Network (CN) 604, a UMTS Terrestrial Radio Access Network (UTRAN) 602, and User Equipment (UE) 610. UE 610 may be similar to UE 102 and configured to include, for example, one or more of the active set managing component 410, downlink communicating component 412, uplink communicating component 414, etc., as described above. In this example, the UTRAN 602 provides various wireless services including telephony, video, data, messaging, broadcasts, and/or other services. The UTRAN 602 may include a plurality of Radio Network Subsystems (RNSs) such as an RNS 607, each controlled by a respective Radio Network Controller (RNC) such as an RNC 606. Here, the UTRAN 602 may include any number of RNCs 606 and RNSs 607 in addition to the RNCs 606 and RNSs 607 illustrated herein. The RNC 606 is an apparatus responsible for, among other things, assigning, reconfiguring and releasing radio resources within the RNS 607. The RNC 606 may be interconnected to other RNCs (not shown) in the UTRAN 602 through various types of interfaces such as a direct physical connection, a virtual network, or the like, using any suitable transport network.

Communication between a UE 610 and a Node B 608 may be considered as including a physical (PHY) layer and a medium access control (MAC) layer. Further, communication between a UE 610 and an RNC 606 by way of a respective Node B 608 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference. In addition, the Node Bs 608 can include one or more of the macro cell base station 104 or downlink serving cell base station 404, the small cell base station 106 or uplink serving cell base station 406, etc., as described herein, and thus may include one or more of the downlink transmission scheduling component 420, non-serving grant component 422, uplink serving cell assigning component 424, serving grant component 430, uplink transmission receiving component 432, rate/power information receiving component 434, etc. Furthermore, in an example, RNC 606 can include RNC 408, and thus may include an uplink serving cell assigning component 440, as described.

The geographic region covered by the RNS 607 may be divided into a number of cells, such as including serving cells provided by the base stations 104, 106, 404, 406, etc., with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 608 are shown in each RNS 607; however, the RNSs 607 may include any number of wireless Node Bs. The Node Bs 608 provide wireless access points to a CN 604 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 610 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 610 may further include a universal subscriber identity module (USIM) 611, which contains a user's subscription information to a network. For illustrative purposes, one UE 610 is shown in communication with a number of the Node Bs 608. The DL, also called the forward link, refers to the communication link from a Node B 608 to a UE 610, and the UL, also called the reverse link, refers to the communication link from a UE 610 to a Node B 608.

The CN 604 interfaces with one or more access networks, such as the UTRAN 602. As shown, the CN 604 is a GSM core network. However, as those skilled in the art will recognize, the various concepts presented throughout this disclosure may be implemented in a RAN, or other suitable access network, to provide UEs with access to types of CNs other than GSM networks.

The CN 604 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 604 supports circuit-switched services with a MSC 612 and a GMSC 614. In some applications, the GMSC 614 may be referred to as a media gateway (MGW). One or more RNCs, such as the RNC 606, may be connected to the MSC 612. The MSC 612 is an apparatus that controls call setup, call routing, and UE mobility functions. The MSC 612 also includes a VLR that contains subscriber-related information for the duration that a UE is in the coverage area of the MSC 612. The GMSC 614 provides a gateway through the MSC 612 for the UE to access a circuit-switched network 616. The GMSC 614 includes a home location register (HLR) 615 containing subscriber data, such as the data reflecting the details of the services to which a particular user has subscribed. The HLR is also associated with an authentication center (AuC) that contains subscriber-specific authentication data. When a call is received for a particular UE, the GMSC 614 queries the HLR 615 to determine the UE's location and forwards the call to the particular MSC serving that location.

The CN 604 also supports packet-data services with a serving GPRS support node (SGSN) 618 and a gateway GPRS support node (GGSN) 620. GPRS, which stands for General Packet Radio Service, is designed to provide packet-data services at speeds higher than those available with standard circuit-switched data services. The GGSN 620 provides a connection for the UTRAN 602 to a packet-based network 622. The packet-based network 622 may be the Internet, a private data network, or some other suitable packet-based network. The primary function of the GGSN 620 is to provide the UEs 610 with packet-based network connectivity. Data packets may be transferred between the GGSN 620 and the UEs 610 through the SGSN 618, which performs primarily the same functions in the packet-based domain as the MSC 612 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 608 and a UE 610. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 610 provides feedback to the node B 608 over the HS-DPCCH to indicate whether it correctly decoded a packet on the downlink.

HS-DPCCH further includes feedback signaling from the UE 610 to assist the node B 608 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 608 and/or the UE 610 may have multiple antennas supporting MIMO technology. The use of MIMO technology enables the node B 608 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 610 to increase the data rate, or to multiple UEs 610 to increase the overall system capacity. This is achieved by spatially precoding each data stream and then transmitting each spatially precoded stream through a different transmit antenna on the downlink. The spatially precoded data streams arrive at the UE(s) 610 with different spatial signatures, which enables each of the UE(s) 610 to recover the one or more the data streams destined for that UE 610. On the uplink, each UE 610 may transmit one or more spatially precoded data streams, which enables the node B 608 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
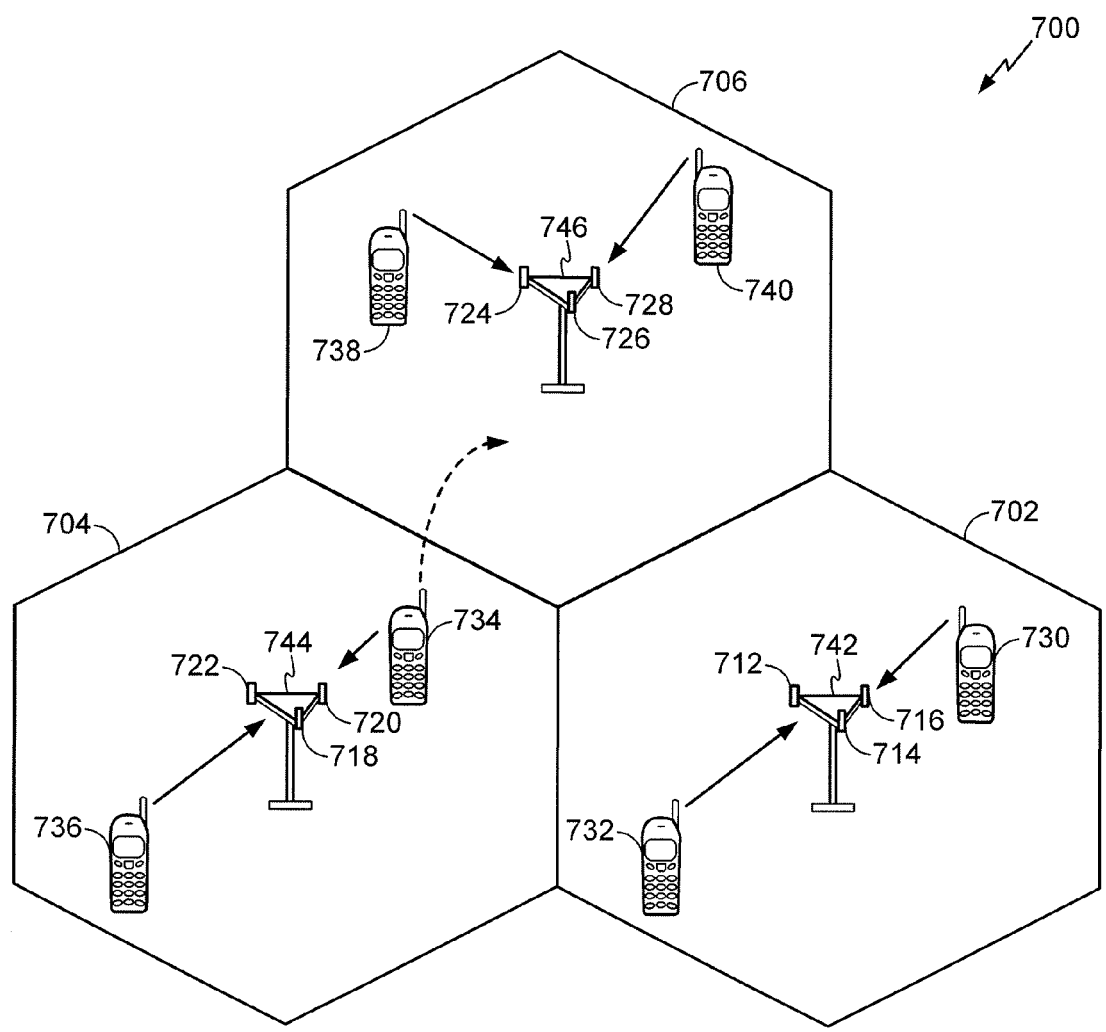
FIG. 7 is a conceptual diagram illustrating an example of an access network for use with a UE configured to perform functions described herein.

Referring to FIG. 7, an access network 700 in a UTRAN architecture is illustrated. The multiple access wireless communication system includes multiple cellular regions (cells), including cells 702, 704, and 706, each of which may include one or more sectors. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 718, 720, and 722 each correspond to a different sector. In cell 706, antenna groups 724, 726, and 728 each correspond to a different sector. The cells 702, 704 and 706 may include several wireless communication devices, e.g., User Equipment or UEs, which may be in communication with one or more sectors of each cell 702, 704 or 706. For example, UEs 730 and 732 may be in communication with Node B 742, UEs 734 and 736 may be in communication with Node B 744, and UEs 738 and 740 can be in communication with Node B 746. Here, each Node B 742, 744, 746 is configured to provide an access point to a CN 604 (see FIG. 6) for all the UEs 730, 732, 734, 736, 738, 740 in the respective cells 702, 704, and 706. UEs 730, 732, 734, 736, 738, and 740 may be similar to UE 102, described above, and Node Bs 742, 744, and/or 746 can correspond to one or more of macro cell base station 104 or downlink serving cell base station 404, small cell base station 106 or uplink serving cell base station 406, etc.

As the UE 734 moves from the illustrated location in cell 704 into cell 706, a serving cell change (SCC) or handover may occur in which communication with the UE 734 transitions from the cell 704, which may be referred to as the source cell, to cell 706, which may be referred to as the target cell. Management of the handover procedure may take place at the UE 734, at the Node Bs corresponding to the respective cells, at a radio network controller 408 or 606 (see FIGS. 4 and 6), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel (DPCH) or fractional downlink dedicated physical channel (F-DPCH) to the UE 734 may constitute the Active Set).

The modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
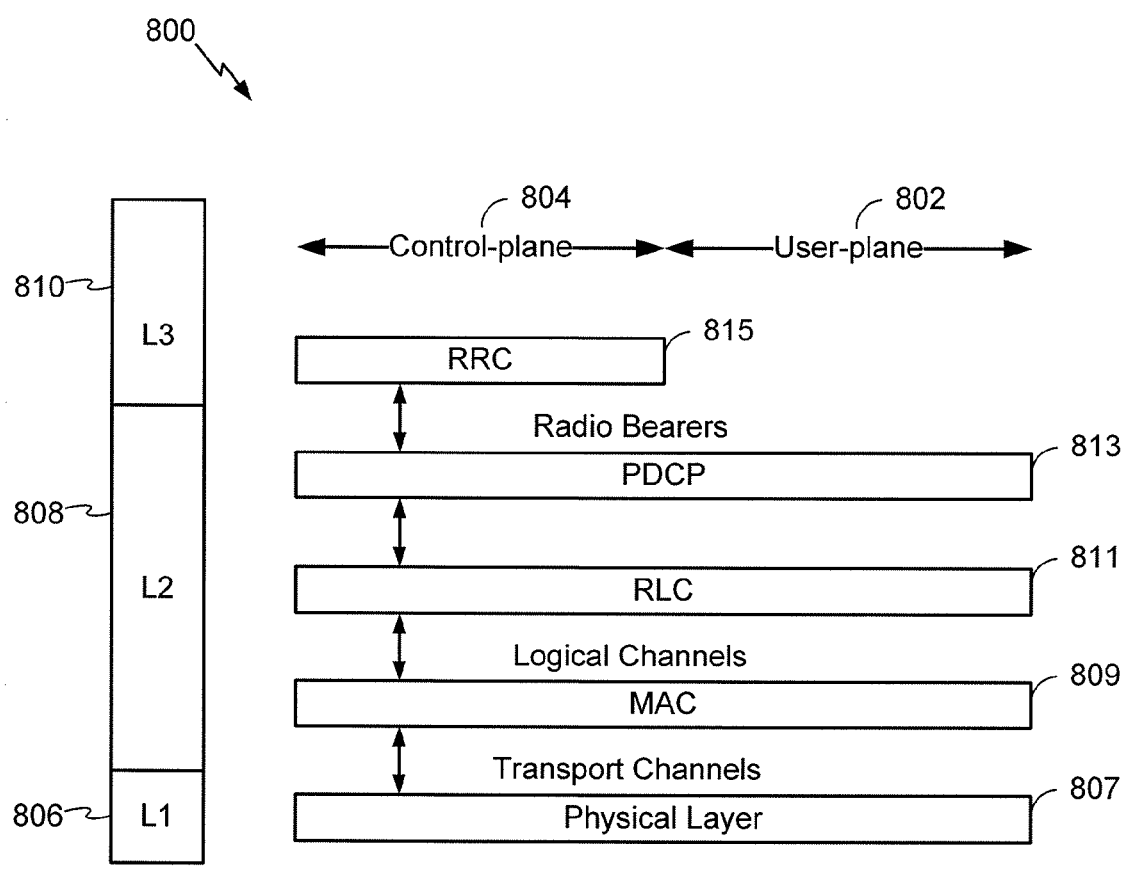
FIG. 8 is a conceptual diagram illustrating an example of a radio protocol architecture for the user and control planes for a base station and/or a UE configured to perform functions described herein.

FIG. 8 is a conceptual diagram illustrating an example of the radio protocol architecture 800 for the user plane 802 and the control plane 804 of a user equipment (UE) or node B/base station. For example, architecture 800 may be included in a network entity and/or UE such as an entity within UE 102, a base station 104, 106, 404, 406 (FIGS. 1 and 4), etc. The radio protocol architecture 800 for the UE and node B is shown with three layers: Layer 1 806, Layer 2 808, and Layer 3 810. Layer 1 806 is the lowest lower and implements various physical layer signal processing functions. As such, Layer 1 806 includes the physical layer 807. Layer 2 (L2 layer) 808 is above the physical layer 807 and is responsible for the link between the UE and node B over the physical layer 807. Layer 3 (L3 layer) 810 includes a radio resource control (RRC) sublayer 815. The RRC sublayer 815 handles the control plane signaling of Layer 3 between the UE and the UTRAN.

In the user plane, the L2 layer 808 includes a media access control (MAC) sublayer 809, a radio link control (RLC) sublayer 811, and a packet data convergence protocol (PDCP) 813 sublayer, which are terminated at the node B on the network side. Although not shown, the UE may have several upper layers above the L2 layer 808 including a network layer (e.g., IP layer) that is terminated at a PDN gateway on the network side, and an application layer that is terminated at the other end of the connection (e.g., far end UE, server, etc.).

The PDCP sublayer 813 provides multiplexing between different radio bearers and logical channels. The PDCP sublayer 813 also provides header compression for upper layer data packets to reduce radio transmission overhead, security by ciphering the data packets, and handover support for UEs between node Bs. The RLC sublayer 811 provides segmentation and reassembly of upper layer data packets, retransmission of lost data packets, and reordering of data packets to compensate for out-of-order reception due to hybrid automatic repeat request (HARQ). The MAC sublayer 809 provides multiplexing between logical and transport channels. The MAC sublayer 809 is also responsible for allocating the various radio resources (e.g., resource blocks) in one cell among the UEs. The MAC sublayer 809 is also responsible for HARQ operations.

Figure 9:
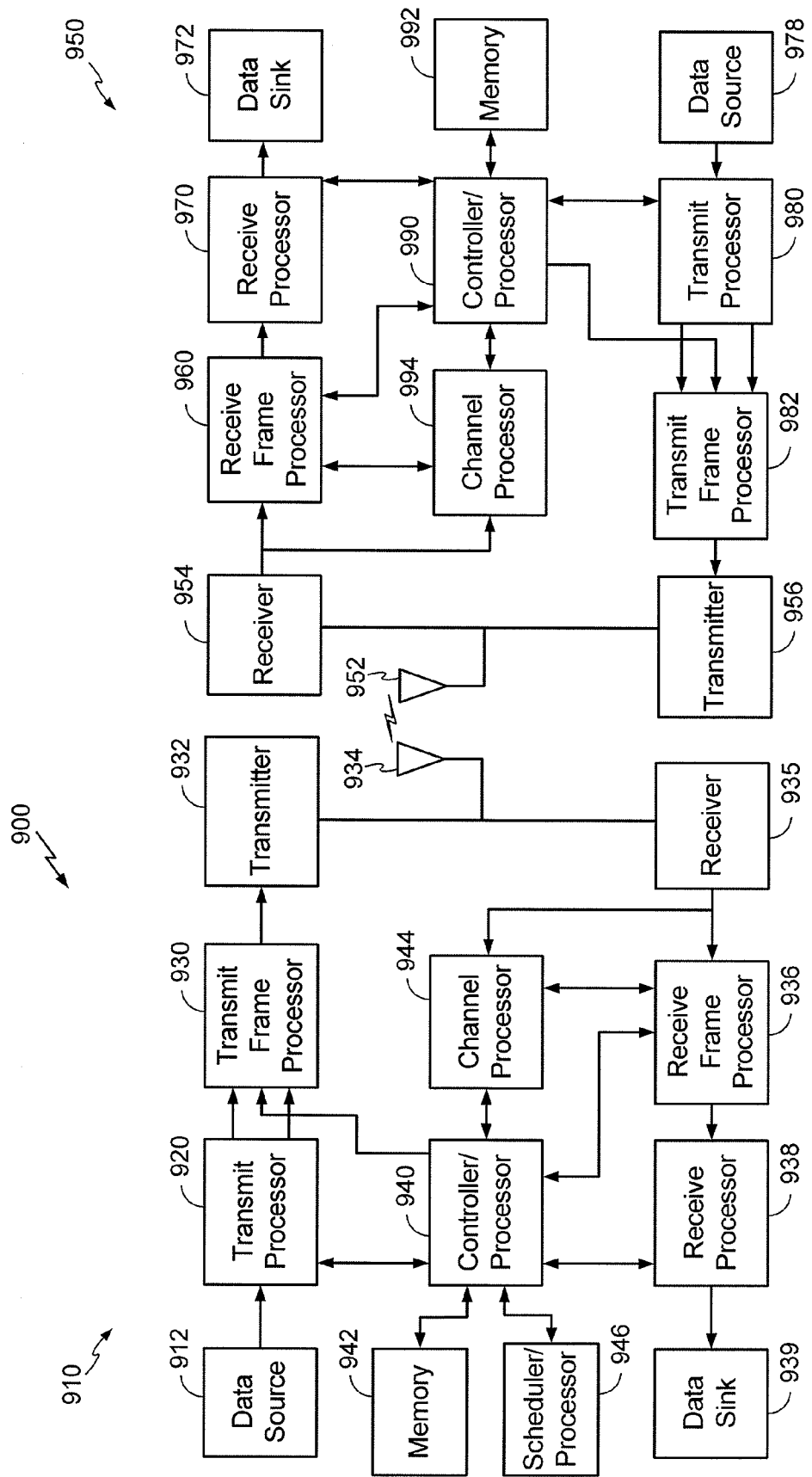
FIG. 9 is a block diagram conceptually illustrating an example of a Node B in communication with a UE in a telecommunications system configured to perform functions described herein.

FIG. 9 is a block diagram of a communication system 900 including a Node B 910 in communication with a UE 950, where Node B 910 may include base stations 104, 106, 404, 406, etc., and the UE 950 may be UE 102 (FIGS. 1 and 4). In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the Node B 910. More specifically, the receive processor 970 descrambles and despreads the symbols, and then determines the most likely signal constellation points transmitted by the Node B 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the Node B 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the Node B 910 or from feedback contained in the midamble transmitted by the Node B 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the Node B 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the Node B 910 and the UE 950, respectively. For example, the controller/processors 940 and 990 may provide various functions including timing, peripheral interfaces, voltage regulation, power management, and other control functions. The computer-readable media of memories 942 and 992 may store data and software for the Node B 910 and the UE 950, respectively. A scheduler/processor 946 at the Node B 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor 504 (FIG. 5) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506 (FIG. 5). The computer-readable medium 506 (FIG. 5) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication of a user equipment (UE), comprising:
    receiving, by the UE over a first downlink channel from a first cell in an active set of the UE, scheduling information for one or more downlink transmissions;
    receiving, by the UE from multiple cells in the active set of the UE, downlink wireless communications based on the scheduling information;
    receiving, by the UE over a second downlink channel from a second cell in the active set of the UE, one or more serving resource grants for uplink communications, wherein the second cell is in the active set of the UE along with the first cell, and wherein the second downlink channel is a different downlink channel than the first downlink channel;
    transmitting, by the UE and based on the downlink wireless communications, uplink communications over resources of the second cell indicated in the one or more serving resource grants; and
    transmitting, by the UE, power control information regarding uplink communications to the second cell.

2. The method of claim 1, wherein the power control information relates to a high speed dedicated physical control channel (HS-DPCCH) with the second cell.

3. The method of claim 1, wherein receiving the one or more serving resource grants is based at least in part on the power control information provided to the second cell.

4. The method of claim 1, further comprising receiving one or more non-serving resource grants from the first cell.

5. The method of claim 4, further comprising adjusting transmission of uplink communications over the resources of the second cell based at least in part on the one or more non-serving resource grants.

6. The method of claim 1, wherein receiving the scheduling information for the one or more downlink transmissions from the first cell is based at least in part on a downlink radio condition between the first cell and the UE relative to other downlink radio conditions of remaining cells in the active set of the UE.

7. The method of claim 6, wherein receiving the one or more serving resource grants from the second cell is based at least in part on an uplink radio condition between the UE and the second cell relative to other uplink radio conditions to remaining cells in the active set of the UE.

8. The method of claim 1, wherein the scheduling information relates to a high-speed downlink shared channel (HS-DSCH), and the one or more serving resource grants relate to an enhanced dedicated channel (E-DCH) and are received over an enhanced absolute grant channel (E-AGCH) in high speed packet access (HSPA).

9. An apparatus for wireless communication of a user equipment (UE), comprising:
    at least one processor of the UE configured to execute:
        a downlink communicating component configured to:
            receive, over a first downlink channel from a first cell in an active set of the UE, scheduling information for one or more downlink transmissions;
            receive, from multiple cells in the active set of the UE, downlink wireless communications based on the scheduling information; and
            receive, over a second downlink channel from a second cell in the active set of the UE along with the first cell, one or more serving resource grants for uplink communications, wherein the second cell is in the active set of the UE along with the first cell, and wherein the second downlink channel is a different downlink channel than the first downlink channel; and an uplink communicating component configured to transmit, based on the downlink wireless communications, uplink communications over resources of the second cell indicated in the one or more serving resource grants; and transmit power control information regarding uplink communications to the second cell; and a memory coupled to the at least one processor.

10. The apparatus of claim 9, wherein the power control information relates to a high speed dedicated physical control channel (HS-DPCCH).

11. The apparatus of claim 9, wherein the downlink communicating component is configured to receive the one or more serving resource grants based at least in part on the power control information provided to the second cell.

12. The apparatus of claim 9, wherein the downlink communicating component is further configured to receive one or more non-serving resource grants from the first cell.

13. The apparatus of claim 12, wherein the uplink communicating component is further configured to adjust transmission of uplink communications over the resources of the second cell based at least in part on the one or more non-serving resource grants.

14. The apparatus of claim 9, wherein the downlink communicating component is configured to receive the scheduling information for the one or more downlink transmissions from the first cell based at least in part on a downlink radio condition between the first cell and the UE relative to other downlink radio conditions of remaining cells in the active set of the UE.

15. The apparatus of claim 14, wherein the downlink communicating component is configured to receive the one or more serving resource grants from the second cell based at least in part on an uplink radio condition between the UE and the second cell relative to other uplink radio conditions to remaining cells in the active set of the UE.

16. The apparatus of claim 9, wherein the scheduling information relates to a high-speed downlink shared channel (HS-DSCH), and the one or more serving resource grants relate to an enhanced dedicated channel (E-DCH) and are received over an enhanced absolute grant channel (E-AGCH) in high speed packet access (HSPA).

17. An apparatus for wireless communication of a user equipment (UE), comprising:
   means for receiving, by the UE over a first downlink channel from a first cell in an active set of the UE, scheduling information for one or more downlink transmissions;
   means for receiving, by the UE from multiple cells in the active set of the UE, downlink wireless communications based on the scheduling information;
   means for receiving, by the UE over a second downlink channel from a second cell in the active set of the UE, one or more serving resource grants for uplink communications, wherein the second cell is in the active set of the UE along with the first cell, and wherein the second downlink channel is a different downlink channel than the first downlink channel;
   means for transmitting, by the UE and based on the downlink wireless communications, uplink communications over resources of the second cell indicated in the one or more serving resource grants; and
   means for transmitting, by the UE, power control information regarding uplink communications to the second cell.

18. The apparatus of claim 17, wherein the power control information relates to a high speed dedicated physical control channel (HS-DPCCH).

19. The apparatus of claim 17, wherein the means for receiving the one or more serving resource grants is operable for receiving the one or more serving resource grants based at least in part on the power control information provided to the second cell.

20. The apparatus of claim 17, further comprising means for receiving one or more non-serving resource grants from the first cell.

21. The apparatus of claim 20, wherein the means for transmitting is operable for adjusting transmission of uplink communications over the resources of the second cell based at least in part on the one or more non-serving resource grants.

22. The apparatus of claim 17, wherein the means for receiving the scheduling information is operable for receiving the scheduling information for the one or more downlink transmissions from the first cell based at least in part on a downlink radio condition between the first cell and the UE relative to other downlink radio conditions of remaining cells in the active set of the UE.

23. The apparatus of claim 22, wherein the means for receiving the one or more serving resource grants is operable for receiving the one or more serving resource grants from the second cell based at least in part on an uplink radio condition between the UE and the second cell relative to other uplink radio conditions to remaining cells in the active set of the UE.

24. A non-transitory computer-readable storage medium, comprising instructions, that when executed by a processor, cause the processor to perform the steps of:
   receiving, by a user equipment (UE) over a first downlink channel from a first cell in an active set of the UE, scheduling information for one or more downlink transmissions;
   receiving, by the UE from multiple cells in the active set of the UE, downlink wireless communications based on the scheduling information;
   receiving, by the UE over a second downlink channel from a second cell in the active set of the UE, one or more serving resource grants for uplink communications, wherein the second cell is in the active set of the UE along with the first cell, and wherein the second downlink channel is a different downlink channel than the first downlink channel;
   transmitting, by the UE and based on the downlink wireless communications, uplink communications over resources of the second cell indicated in the one or more serving resource grants; and
   transmitting, by the UE, power control information regarding uplink communications to the second cell.

25. The non-transitory computer-readable storage medium of claim 24, wherein the power control information relates to a high speed dedicated physical control channel (HS-DPCCH).

26. The non-transitory computer-readable storage medium of claim 24, wherein receiving the one or more serving resource grants is based at least in part on the power control information provided to the second cell.

27. The non-transitory computer-readable storage medium of claim 24, further comprising instructions, that when executed by the processor, cause the processor to receive one or more non-serving resource grants from the first cell.

28. The non-transitory computer-readable storage medium of claim 27, further comprising instructions, that when executed by the processor, cause the processor to adjust transmission of uplink communications over the resources of the second cell based at least in part on the one or more non-serving resource grants.

29. The non-transitory computer-readable storage medium of claim 24, wherein receiving the scheduling information for the one or more downlink transmissions from the first cell is based at least in part on a downlink radio condition between the first cell and the UE relative to other downlink radio conditions of remaining cells in the active set of the UE.

30. The non-transitory computer-readable storage medium of claim 29, wherein receiving the one or more serving resource grants from the second cell is based at least in part on an uplink radio condition between the UE and the second cell relative to other uplink radio conditions to remaining cells in the active set of the UE.

\* \* \* \* \*